(12) United States Patent
Larsson et al.

(10) Patent No.: US 10,125,286 B2
(45) Date of Patent: Nov. 13, 2018

(54) COATING COMPOSITION, A METHOD FOR COATING A SUBSTRATE, A COATED SUBSTRATE, A PACKAGING MATERIAL AND A LIQUID PACKAGE

(71) Applicant: BILLERUDKORSNAS SKOG & INDUSTRI AKTIEBOLAG, Gavle (SE)

(72) Inventors: Johan Larsson, Gavle (SE); Anders Karlsson, Gavle (SE)

(73) Assignee: BILLERUDKORSNAS SKOG & INDUSTRI AKTIEBOLAG, Gavle (SE)

( * ) Notice: Subject to any disclaimer, the term of this patent is extended or adjusted under 35 U.S.C. 154(b) by 1164 days.

(21) Appl. No.: 14/355,474

(22) PCT Filed: Oct. 30, 2012

(86) PCT No.: PCT/EP2012/071494
§ 371 (c)(1),
(2) Date: Apr. 30, 2014

(87) PCT Pub. No.: WO2013/064500
PCT Pub. Date: May 10, 2013

(65) Prior Publication Data
US 2014/0377486 A1  Dec. 25, 2014

(30) Foreign Application Priority Data

Oct. 31, 2011  (SE) ........................................ 1100821
Mar. 19, 2012  (SE) ........................................ 1250261

(51) Int. Cl.
*C09D 129/04*  (2006.01)
*B32B 27/10*  (2006.01)
(Continued)

(52) U.S. Cl.
CPC ........... *C09D 129/04* (2013.01); *B05D 1/305* (2013.01); *B32B 27/10* (2013.01); *B65D 25/14* (2013.01);
(Continued)

(58) Field of Classification Search
CPC . B65D 5/56; B65D 5/563; B65D 5/62; B65D 25/14; B65D 31/02; B65D 65/38;
(Continued)

(56) References Cited

U.S. PATENT DOCUMENTS 6,153,288 A * 11/2000 Shih ..................... B41M 5/5245
                                                347/105
6,447,712 B1 * 9/2002 Dogan ..................... C04B 33/32
                                                264/607
(Continued)

FOREIGN PATENT DOCUMENTS

CN  1839186 A  9/2006
CN  1989298 A  6/2007
(Continued)

OTHER PUBLICATIONS

International Search Report Corresponding to International Application No. PCT/EP2012/071495; dated Feb. 20, 2013; 5 Pages.
(Continued)

*Primary Examiner* — Walter Aughenbaugh
(74) *Attorney, Agent, or Firm* — Myers Bigel, P.A.

(57) ABSTRACT

The present invention relates to a curtain coatable gas barrier coating composition comprising polyvinyl alcohol and a surfactant, in which the surfactant is a water-soluble non-ionic ethoxylated alcohol. The present invention also relates to a method for providing a substrate with a gas barrier layer by means of the coating composition, and a coated substrate having at least one gas barrier layer obtained by coating the substrate with the coating composition. Further, the inven-
(Continued)

tion relates to a packaging material comprising a coated paperboard coated with the coating composition, and a liquid package comprising such a packaging material.

12 Claims, 1 Drawing Sheet

(51) Int. Cl.

| | |
|---|---|
| D21H 23/48 | (2006.01) |
| B65D 65/38 | (2006.01) |
| C09D 103/02 | (2006.01) |
| D21H 17/06 | (2006.01) |
| D21H 17/36 | (2006.01) |
| D21H 19/60 | (2006.01) |
| B05D 1/30 | (2006.01) |
| B65D 25/14 | (2006.01) |
| C09D 101/02 | (2006.01) |
| B65D 30/00 | (2006.01) |
| B65D 85/72 | (2006.01) |
| D21H 19/12 | (2006.01) |
| C09D 7/63 | (2018.01) |
| C08K 3/34 | (2006.01) |
| C08K 7/00 | (2006.01) |
| D21H 19/40 | (2006.01) |
| D21H 21/52 | (2006.01) |
| C08K 5/06 | (2006.01) |

(52) U.S. Cl.
CPC .............. *B65D 31/00* (2013.01); *B65D 65/38* (2013.01); *B65D 85/72* (2013.01); *C09D 7/63* (2018.01); *C09D 101/02* (2013.01); *C09D 103/02* (2013.01); *D21H 17/06* (2013.01); *D21H 17/36* (2013.01); *D21H 19/12* (2013.01); *D21H 19/60* (2013.01); *D21H 23/48* (2013.01); *C08K 3/346* (2013.01); *C08K 5/06* (2013.01); *C08K 7/00* (2013.01); *C08K 2201/008* (2013.01); *C08L 2205/03* (2013.01); *D21H 19/40* (2013.01); *D21H 21/52* (2013.01); *Y10T 428/1303* (2015.01); *Y10T 428/273* (2015.01); *Y10T 428/277* (2015.01); *Y10T 428/31895* (2015.04); *Y10T 428/31902* (2015.04); *Y10T 428/31975* (2015.04)

(58) Field of Classification Search
CPC ........ B65D 85/72; B65D 85/78; B65D 85/80; C08K 5/06; C08K 5/10; C08L 29/04; C09D 129/04; C09D 129/06; C09D 129/08; Y10T 428/1352; Y10T 428/1372; Y10T 428/1379; Y10T 428/1383
See application file for complete search history.

(56) References Cited

U.S. PATENT DOCUMENTS

| | | | |
|---|---|---|---|
| 2001/0025021 A1* | 9/2001 | Wittkowski | C08F 210/02 510/475 |
| 2004/0121080 A1 | 6/2004 | Urscheler et al. | |
| 2006/0099410 A1* | 5/2006 | Miller | C09D 129/04 428/341 |
| 2010/0323189 A1* | 12/2010 | Illsley | B32B 7/12 428/331 |

FOREIGN PATENT DOCUMENTS

| | | |
|---|---|---|
| WO | WO 2005/023945 A2 | 3/2005 |
| WO | WO 2006/010927 A2 | 2/2006 |
| WO | WO2006010927 A2 | 2/2006 |
| WO | WO2009085136 A1 | 7/2009 |

OTHER PUBLICATIONS

Notification of Transmittal of the International Preliminary Report on Patentability in corresponding PCT Application No. PCT/EP2012/071495; dated Oct. 3, 2013; 12 pages.
International Search Report Corresponding to International Application No. PCT/EP2012/071494; dated Feb. 20, 2013; 4 Pages.
Notification of Transmittal of the International Preliminary Report on Patentability in corresponding PCT Application No. PCT/EP2012/071494; dated Nov. 13, 2013; 15 pages.
"Tergitol TMN-6 (90%) Surfactant", Dow, Mar. 13, 2009, pp. 1-2, XP055051489, Retrieved Date: Jan. 29, 2013, From URL: http://msdssearch.dow.com/PublishedLiteratureDOWCOM/dh_0234/0901b8038023484a.pdf?filepath=surfactants/pdfs/noreg/119-01939.pdf&fromPage=GetDoc.
"Surfynol CT-211 Grind Aid", Air Products, Jan. 1, 2002, XP055051380, Retrieved Date: Jan. 1, 2002, From URL: http://www.airproducts.com/~/media/downloads/s/surfynol-ct-211/data-sheets/en-surfynol-CT-211-datasheet-15870-ct-211.pdf?productType=Chemicals&productLevel1=Surfactants&productLevel2=Wetting—Agent&productLevel3=Surfynol-CT-211.
"DuPont Zonyl FSN—Fluorosurfactant", DuPont Magazine, Aug. 24, 2003, pp. 1-2, XP003000256, du Pont de Nemours and Co., Wilmington, DE.
"Surfynol SE-F Surfactant", Air Products, Jan. 1, 2002, XP055051367, Retrieved Date: Jan. 28, 2013, From URL: http://www.airproducts.com/~/media/downloads/s/surfynol-se-f/data-sheets/en-surfynol-se-f-datasheet.pdf?productType=Chemicals&productLevel1=Surfactants&productLevel2=Wetting—Agent&productLevel3=Surfynol-SE-F.
"Lutensol TO types" BASF Specialty Chemicals, Technical Information, Feb. 2, 1997, pp. 1-15, XP055001280, Germany, Retrieved Date: Jun. 23, 2011, From URL: http://www.timing-ouhan.com/images/lutensoltotypes.pdf.
Böhn, Roland, "Lutensol XL and Lutensol XP", Specialty Surfactants Group Meeting, Mar. 11, 2004, pp. 1-26, XP055051592, Retrieved Date: Jan. 29, 2013, From URL: http://www.lubricantindex.co.uk/Basf/Lutensolxp.xl.bacs.pdf.
"Lutensol ON types", BASF Technical Information, Mar. 2005, pp. 1-12, XP002691149, Ludwigshafen, Germany.
"NanoSeal TM—Barrier Coating—Product Description: NSC-100A (Provisional Data Sheet)", Nanopack Inc., Apr. 20, 2010, XP002691150, Retrieved Date: Jan. 29, 2013, From URL: http://wayback.archive.org/web/2011042345505/http://www.nanopackinc.com/products/asp.
Chinese First Office Action and Search Report Corresponding to Application No. 201280051977.5; dated Sep. 7, 2015; English Translation, 6 Pages.

\* cited by examiner

COATING COMPOSITION, A METHOD FOR COATING A SUBSTRATE, A COATED SUBSTRATE, A PACKAGING MATERIAL AND A LIQUID PACKAGE

RELATED APPLICATIONS

The present application is a 35 U.S.C. § 371 national phase application of PCT International Application No. PCT/EP2012/071494, filed Oct. 30, 2012, which claims priority from Swedish Patent Application Nos. 1100821-6, filed Oct. 31, 2011 and 1250261-3, filed Mar. 19, 2012, the disclosures of which are hereby incorporated herein by reference in their entireties. PCT International Application No. PCT/EP2012/071495 is published in English as PCT Publication No. WO 2013/064500 A1.

TECHNICAL FIELD OF THE INVENTION

The present invention relates to a coating composition comprising polyvinyl alcohol and a surfactant. In particular it relates to a gas barrier coating composition suitable for curtain coating. The present invention also relates to a method for providing a substrate with a gas barrier layer by means of the coating composition, a coated substrate, a packaging material comprising a coated paperboard, and a liquid package comprising such a packaging material.

BACKGROUND OF THE INVENTION

Curtain coating is a coating process in which a linear flow of a liquid coating composition is deposited on a surface of a moving substrate, such as paper web. The coating composition forms a liquid sheet that falls freely before impinging onto the moving substrate that is to be coated.

Curtain coating is a technique well suited for coating a paper web with a liquid barrier layer, since the barrier substance must form a film that covers the surface entirely, or as close to entirely as possible. However, the curtain coating process is susceptible to certain defects, such as irregular heel formation, air entrainment and curtain instabilities that may result in a coated surface that displays smaller or bigger areas that lacks coating. In order to discover such defects in the coverage of the coating, which can be very small due to e.g. air bubbles in the liquid coating, a test may be made by applying a coloured test liquid onto the coated surface. Any defects will then appear as coloured areas or so called pinholes. For some applications it is particularly important that the coating does not contain any defects or at least very few defects, for example in the food industry and for liquid packages (i.e. packages containing liquids).

It is previously known that polyvinyl alcohol is a good barrier against fat, solvents and gases. A coating comprising polyvinyl alcohol deposited on a substrate is known to be suitable as a barrier against fat, oxygen, odours, aromas, etc. in for example packaging material based on paperboard substrate.

In curtain coating a suitable dynamic surface tension, calculated from Mach-angle measurements in the falling curtain, is required in order for the free falling curtain of coating liquid to form a stable curtain and not to have defects in the form of holes. Typically, for Newtonian fluids, the coating liquid should have a dynamic surface tension of less than 40 mNm to satisfy the criteria of a falling curtain without the formation of holes. However, polyvinyl alcohol does have a considerably higher surface tension which leads to an instable curtain at low flow rates.

In order to reduce the surface tension of polyvinyl alcohol it has been proposed to add a surface active substance, a surfactant, to the polyvinyl alcohol, for example as described in EP 2182113, using a surfactant of the type Air Products EnviroGem AE03. However, it has been found that even though the stability of the curtain improved when using a surfactant, the barrier effect of the coating deteriorated, and to such a degree that it was not usable for producing liquid packages. As other examples, it has been proposed to add relatively large amounts of ethanol or similar alcohol to the polyvinyl alcohol, but this is however not a satisfying solution of the coating problem in the paper industry since it requires handling and recycling of resulting volatile organic compounds (VOC).

To summarise, in order to use curtain coating to obtain a barrier on a substrate, such as a polyvinyl alcohol barrier on a fibre substrate, e.g. paperboard, it is necessary to use added substances that reduces the dynamic surface tension in order to have a stable process, but these substances will at the same time have a negative effect on the film formation and therefore the barrier will be defective.

SUMMARY OF THE INVENTION

An object of the present invention is to provide an improved coating composition suitable for curtain coating, in particular for the above mentioned fields of application.

Another object is to obtain a coating that will result in a final product that is suitable for the food industry, that is free of any toxic or unhealthy substances, and which is safe to use. Moreover, when used in a packing material, it must not contain any substances that can migrate into the food product or emit any smells or aromas when used in food or liquid packages.

The objects are achieved by the present invention.

According to a first aspect of the present invention is defined a curtain coatable gas barrier coating composition comprising polyvinyl alcohol and a surfactant, wherein the surfactant is a water-soluble non-ionic ethoxylated alcohol. This coating composition makes it possible to obtain a stable curtain with a low number of pinholes in the coating of a coated substrate, such as a fibre substrate, e.g. a paperboard. This coating provides good barrier qualities against grease, fat, oils etc, and gases, e.g. oxygen, aromas and odours.

According to an embodiment of the present invention, the surfactant may be a saturated iso-C13 alcohol. According to a further feature of this embodiment, the surfactant has the formula $RO(CH_2CH_2O)_xH$, wherein $R=iso-C_{13}H_{27}$ and x is 8 or higher According to another embodiment of the present invention, the surfactant may be an alkyl polyethylene glycol ether based on C10-Guerbet alcohol, with a degree of ethoxylation of 7 or higher.

According to yet another embodiment of the present invention, the surfactant may be a saturated short-chain fatty alcohol. According to a further feature of this embodiment, the surfactant has the formula $RO(CH_2CH_2O)_xH$, wherein R=a saturated short-chain alcohol and x is 5 or higher.

The coating composition may comprise a concentration of 0.05-2.0 weight % of non-ionic ethoxylated alcohol surfactant, preferably 0.1-1.0%, and more preferably 0.2-0.5 weight %, of the total weight of the bone dry coating composition.

The solid content of the composition may be 4-20%; preferably 7-15%, or 6-12%, or even 8-10%. The balance is water.

Further, the coating composition may comprise platy particles, for example it may comprise Montmorillonite clay in nano particle form. This has the advantage of improving the gas barrier function.

According to a second aspect of the invention is defined a method for providing a substrate with a gas barrier layer in at least one coating step, comprising application of a coating composition as defined in any one of the claims defining the coating composition, by curtain coating the substrate with the coating composition in at least one coating step. Additional coating steps are of course foreseeable, and generally there is a drying step between each coating step. An example of an additional coating step is a pigment coating step, which may very well be made before coating with the gas barrier coating composition. Further, the coat weight of the at least one coating layer may be 0.4 g/m$^2$ or more and less than 7.0 g/m$^2$. The coat weight of the barrier layer may be 0.8 g/m$^2$ or more and less than 7.0 g/m$^2$, and preferably 1.2-4.0 g/m$^2$, and even more preferably 1.6-3.2 g/m$^2$.

According to one feature, the substrate may be a fibre substrate or a paper or a paperboard. However, it is conceivable to implement the invention on other substrates, without going beyond the scope of the invention.

According to a third aspect of the present invention is defined a coated substrate having at least one gas barrier layer obtained by coating a substrate with a coating composition as defined in any one of claims defining the coating composition.

The gas barrier layer may be a barrier against oxygen in particular, and gases including odours and/or aromas Further, the coated substrate may have a gas barrier layer that has a coat weight of 0.8 g/m$^2$ or more and less than 7.0 g/m$^2$, and preferably 1.2-4.0 g/m$^2$, and even more preferably 1.6-3.2 g/m$^2$.

In one embodiment, the coated substrate may be a paperboard comprising at least one fibre based layer coated with the coating composition. Alternatively, the substrate may be a paper or any other substrate requiring the concerned type of barrier.

According to a fourth aspect of the present invention, is defined a packaging material comprising a coated paperboard as defined above, further comprising a layer of low density polyethylene on each side of the coated paperboard, and having an OTR value of less than 10 ml/m$^2$*24 h*1 atm. OTR stand for oxygen transmission rate and the instrument used for the measurement is Mocon Ox Tran 2/21.

According to a fifth aspect of the present invention is defined a liquid package made from a packaging material as defined above.

As mentioned before, typically, for Newtonian fluids, the coating liquid should have a dynamic surface tension of less than 40 mNm to satisfy the criteria of a falling curtain without the formation of holes. However, according to the present invention it has been advantageously found that polyvinyl alcohol, which is a non-Newtonian fluid, do not necessary need as low surface tension as Newtonian fluids due to its elasticity. There is then a need to obtain a good relationship between the flow rate and the surface tension and the non-newtonian fluid characteristics. Some common concepts of curtain stability are the minimum flow which can be reached without rupture of the liquid curtain and the minimum flow at which the curtain heals itself to a completely defect free liquid curtain. In accordance with the present invention, it has surprisingly been found that the surface tension for polyvinyl alcohol may have dynamic surface tension values of up to 50 mNm, and still have a defect free operation even at very low flow rates such as lower than 4.0 liters/minute*meter.

Further features and advantages will become apparent from the following detailed description of the invention and test examples.

BRIEF DESCRIPTION OF THE DRAWINGS

The invention will now be described in more detail, with reference being made to test examples and the enclosed schematic drawings illustrating different aspects and embodiments of the invention, given as examples only, and in which.

DETAILED DESCRIPTION OF THE INVENTION

Figure 1A:
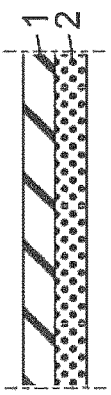
FIGS. 1a-1d shows schematically examples of a coated substrate according to the present invention.

During the search for a suitable surfactant and a suitable method, many different commercially available surfactants were tested that were alleged to be suitable for curtain coating. However, they were all found unsuitable since they all failed either in providing a stable curtain or in providing a sufficiently good barrier.

After having performed many tests it was surprisingly found a group of surfactants that managed to provide the desired result of a stable curtain and a high quality barrier with an acceptable low amount of pinholes. This group of surfactants was non-ionic ethoxylated alcohols, such as sold under the trade names of Lutensol ON and Lutensol TO, by BASF. In particular Lutensol ON50, Lutensol ON70 and Lutensol TO8 were found to provide the required results.

According to the product information supplied by BASF, the Lutensol ON types are non-ionic surfactants. They are alkyl polyethylene glycol ethers made from a saturated synthetic, short-chain fatty alcohol. They conform to the following formula: RO(CH2CH2O)xH, where R=saturated, synthetic, short-chain fatty alcohol x=3, 5, 6, 7, 8 or 11

The numeric code in the product name usually indicates the degree of ethoxylation. The Lutensol ON types are manufactured by causing the fatty alcohol to react with ethylene oxide in stoichiometric proportions. The ethoxylation temperature is kept as low as possible. This, combined with the high purity of the feedstocks, ensures that high-performance products with low toxicity are obtained. According to additional information available from BASF, R may be iso-C10.

According to the product information supplied by BASF, the Lutensol TO types are non-ionic surfactants. They are made from a saturated iso-C13 alcohol. They conform to the following structural formula: RO(CH2CH2O)xH, where R=iso-C13 H27 x=3, 5, 6, 6.5, 7, 8, 10, 12, 15 or 20

The numeric code in the product name indicates the degree of ethoxylation. The Lutensol TO types are manufactured by causing the iso-C13 oxo alcohol to react with ethylene oxide in stoichiometric proportions. The ethoxylation temperature is kept as low as possible. This, combined with the high purity of the feedstocks, ensures that high-performance products with low toxicity are obtained.

In the case of Lutensol ON50, x (the degree of ethoxylation) is 5, and in the case of Lutensol ON70, x is 7. A Lutensol ON having a lower molecular weight, Lutensol ON30 (x=3), was also tested but did not result in the desired effects.

In the case of Lutensol T08, x is 8. Lutensol TO8 has a molecular weight of approximately 600 g/mol. Also for this group, a Lutensol TO having a lower molecular weight, Lutensol TO6 (x=6), was also tested but did not result in the desired effects.

The non-ionic ethoxylated alcohols having the desired effect are water soluble and provide relatively slow wetting. Lutensol ON30 and TO6, on the other hand, are not water soluble. Lutensol ON is water soluble for a degree of ethoxylation of 5 and above, while Lutensol TO is water soluble for a degree of ethoxylation of 8 and above.

Another such water soluble non-ionic ethoxylated alcohol is Lutensol XP.

According to the product information supplied by BASF, the Lutensol XP types are branched non-ionic surfactants. They are alkyl polyethylene glycol ethers based on $C_{10}$-Guerbet alcohol and ethylene oxide. The Lutensol® XP types are manufactured by reacting the $C_{10}$-alcohol with ethylene oxide in stoichiometric proportions. The numeric portion of the product name indicates the general degree of ethoxylation. The product is water soluble when the degree of ethoxylation is 7 or higher.

Tests with good and satisfying results were performed with a liquid coating composition comprising polyvinyl alcohol, of which a solution was prepared according to the instructions on the particular product, and to which solution the concerned surfactant was added according to the following:

Concentration of surfactant (weight % of added surfactant as from package of the weight of the total bone dry composition): 0.05-2%; preferably 0.1-1.0% or even 0.2-0.5%; Solid content of the composition: 4-20%; preferably 7-15%, or even 8-10%.

The tests were made by depositing the liquid coating composition on a fibre based moving web in a curtain coating process. The web was paperboard.

Test results are listed in Table 1. The results in the table are measured on paperboard coated in a curtain coating process with two layers of the coating composition according to the invention, each layer being equal or not in coat weight to the other layer, totalling 2.0-3.0 $g/m^2$. In this table are also shown comparative tests performed with a coating comprising polyvinyl alcohol (PvOH) alone and a coating composition comprising polyvinyl alcohol and the by Cytec, USA, commercially available surfactant Aerosol OT75 comprising "Sodium dioctyl sulfosuccinate", which did not result in a satisfying gas barrier.

TABLE 1

Test examples

| Coating composition | Coat weight $g/m^2$ | Visual observation | Curtain stability | Flow (min) l/min *m | KIT-number | Pinholes/ $dm^2$ | AO2IR $ml/dm^2 \cdot$ 24 h | OTR $ml/m^2*$ 24 h* 1 atm |
|---|---|---|---|---|---|---|---|---|
| PvOH only | 3.2 | OK at high flow rates only | Holes in the film | 10 | 1 | 237 | 1817 | 5.8 |
| PvOH + 0.2% Aerosol OT75 | 2.4 | OK | OK | 6 | 1 | 252 | 5152 | 61.8 |
| PvOH + 0.3% Lutensol ON70 | 2.4 | OK | OK | 6 | 12 | 22 | 296 | — |
| PvOH + 0.3% Lutensol ON70 | 3.0 | OK | OK | 6 | — | 4 | 51 | 7 |
| PvOH + 10% Cloisite + 0.3% Lutensol ON70 | 2.0 | OK | OK | 6 | 12 | 4 | 94 | 5.2 |
| PvOH + 10% Cloisite + 0.3% Lutensol ON70 | 3.0 | OK | OK | 6 | 12 | 3 | 13 | 2.9 |

KIT=TAPPI T 559 KIT test (repellency of paper and board to grease, oil, and waxes)

AO2IR is short for Ambient Oxygen Ingress Rate which is a method for measuring oxygen gas transmission with a Perm-Mate instrument supplied by FBI Dansensor or Systech Illinois.

OTR is short for Oxygen Transmission Rate, measured at 23° C. and 50% RH by the instrument Mocon Ox Tran 2/21. A low KIT number indicates resistance only against fat; a high KIT number indicates high resistance against fat and solvents;

A low AO2IR value indicates high resistance against gas transmission.

Flow (min) l/min*m=minimum flow rate in curtain

The OTR is measured on a packaging material comprising the inventive coated paperboard provided with a polyethylene layer of 30 g/m2. A low OTR value indicates good barrier function.

The coating composition may also comprise Montmorillonite clay, as mentioned before, or talc, kaolin clay or other similar solid additives in platy form or nano-particle form, while maintaining good barrier results, which has also been proven in tests. The tests performed with Montmorillonite (Cloisite) are also shown in Table 1. The clay or other suitable platy or nano form additives may be added to the polyvinyl alcohol in an amount of 1-20% dry weight of the total dry weight of the composition, preferably 3-15% and more preferably 5-10%.

The barrier effect represented by a regular pinhole evaluation showed that it was possible to obtain a coating layer with a low amount of pinholes and a low AO2IR-value down to a coating layer of 2.4 g/m$^2$ and even down to 2.0 g/m$^2$ with Montmorillonite. The coating layer was obtained in a curtain coating process using the composition and achieving the layer in two coating steps of 1.2 g/m$^2$ and 1.0 g/m$^2$ respectively per step.

Particularly good barrier results are the results showing a KIT number of 8 or above (12 being the maximum number) and less than 50 pinholes/dm$^2$.

Particularly good gas barrier results are the results showing a value of the oxygen transmission rate (OTR) of less than 10 ml/m2*24 h*1 atm.

The tests were performed with a velocity of the web substrate between 420 and 850 m/min with good results. With a curtain flow rate of at least 6 l/min*m and stable curtain conditions with less than 50 pinholes/dm$^2$, it can be shown that it is theoretically possible to have a velocity of 250-1500 m/min, or even more, with a coat weight of 0.4-4.0 g/m$^2$ applied in two layers, totalling 0.8-8.0 g/m$^2$, and achieve satisfactory barrier results.

It should be generally understood that the present invention is not limited to the surfactant products with the above trade names, but there may be similar/corresponding products sold under other trade names by other suppliers or manufacturers which will work accordingly. It should also be mentioned that a possibility is foreseen to mix two or more surfactants, and it can also be foreseen that other components may be added to the coating composition, without departing from the scope of the present invention.

The polyvinyl alcohols used for the tests were supplied from Kuraray Nordic Oy in the form of product range Mowiol 6/98, 15/99 and 28/99, and it was prepared by dissolving in water according to the supplier's instructions. The Montmorillonite clay was supplied by Southern Clay Products, USA in the form of the product Cloisite Na+. Tests were also made with kaolin clay and talc, with similar good results as with Montmorillonite. The kaolin clay used was supplied by Imerys in the form of Product Barrisurf LX. The talc used was supplied by FinnTalc Oy in the form of the product Finntalc C10B. It should be clear that also other similar types of polyvinyl alcohols, and other brands of the mentioned substances may be used without departing from the scope of the present invention. It is concluded that the present invention makes it possible to obtain a barrier coated paperboard that is suitable for liquid packages, in which the polyvinyl alcohol layer provides an oxygen barrier and other additional layers, e.g. polyethylene, provides a liquid barrier and sealing properties.

The concerned liquid coating composition can generally be prepared by adding polyvinyl alcohol and also Montmorillonite (or talc or kaolin clay) when applicable, in powder form to cold water. Thereby a liquid is obtained which is then heated. After preparation, the liquid shall be allowed to cool down before the surfactant is added and then the resulting composition is ready to be used in the curtain coating process. Alternatively, each of the substances may prepared by itself, before mixing the substances with each other, heating and then adding the surfactant in order to obtain the final composition.

Figure 1B:
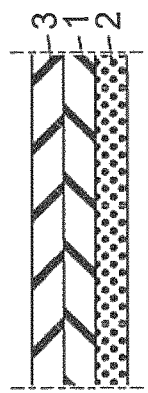
Figure 1C:
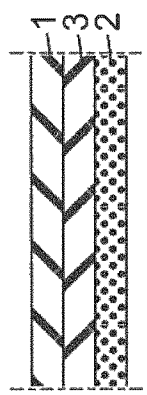
Figure 1D:
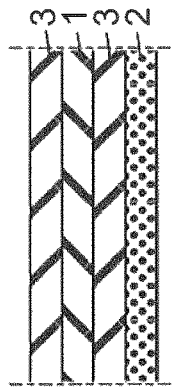
Figure 2A:
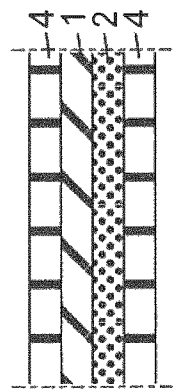
FIGS. 2a-2d shows schematically examples of a packaging material according to the present invention.
Figure 2B:
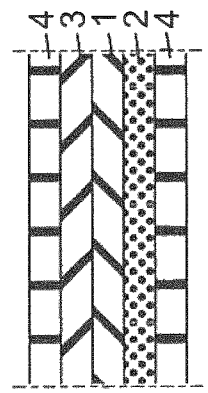
Figure 2C:
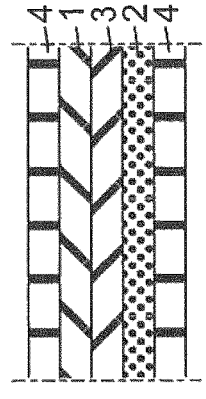
Figure 2D:
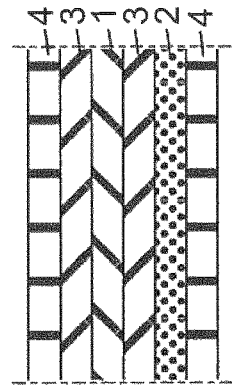

In FIGS. 1a-1d is schematically illustrated examples of a coated substrate according to the present invention. In FIG. 1a is shown a coated substrate where the substrate 1 is a paperboard comprising at least one fibre based layer, and the paperboard is coated with a gas barrier coating layer 2 comprising a coating composition according to the present invention. In FIG. 1b, the coated substrate is further provided with a pigment coating layer 3 on the opposite side of the paperboard layer 1, i.e. on that side of the paperboard layer 1 that is not coated with the barrier coating 2. In FIG. 1c, the coated substrate of FIG. 1a is also provided with a pigment coating layer 3, but in this example the pigment coating layer 3 is provided between the paperboard layer 1 and the barrier coating layer 2. Consequently, the barrier coating 2 has been applied on top of the already applied pigment coating layer 3. Finally, in FIG. 1d, the coated paperboard of FIG. 1c has been provided with an additional pigment coating layer 3, resulting in a paperboard layer 1 having a pigment coating layer 3 on both sides and a barrier coating layer 2 applied on one of the pigment coating layers 3.

FIGS. 2a-2d shows schematically examples of a packaging material according to the present invention. FIGS. 2a-2d illustrates a coated substrate corresponding to FIGS. 1a-1d respectively, which has been provided with a polyethylene layer 4 on both sides.

The present invention is not limited to the disclosed examples, but may be modified in many ways that would be apparent to the skilled person, within the scope of the appended claims.

The invention claimed is:

1. A curtain coatable gas barrier coating composition comprising polyvinyl alcohol and a surfactant, wherein the surfactant is a water-soluble non-ionic ethoxylated alcohol and the solids content of the composition is 4-20%.

2. The coating composition according to claim 1, wherein the surfactant has the formula RO(CH$_2$CH$_2$O)$_x$H, wherein R=iso-C$_{13}$H$_{27}$ and x is 8 or higher.

3. The coating composition according to claim 1, wherein the surfactant is an alkyl polyethylene glycol ether based on C10-Guerbet alcohol, with a degree of ethoxylation of 7 or higher.

4. The coating composition according to claim 1, wherein the surfactant has the formula RO(CH$_2$CH$_2$O)$_x$H, wherein R=iso-C$_{10}$ and x is 5 or higher.

5. The coating composition according to claim 1, wherein the composition, when dried to a bone dry composition, comprises a concentration of 0.05-2.0 weight % of non-ionic ethoxylated alcohol surfactant of the total weight of said bone dry coating composition.

6. The coating composition according to claim 1, wherein the solids content is 6-12%.

7. The coating composition according to claim 1, comprising platy particles.

8. The coating composition according to claim 7, comprising Montmorillonite clay in nano particle form.

9. A method for providing a substrate with a gas barrier layer applied in at least one coating step, comprising applying a coating composition as defined in claim 1 by curtain coating the substrate with the coating composition in at least one coating step.

10. The method according to claim 9, wherein a coat weight of the gas barrier layer is 0.4 g/m$^2$ or more and less than 7.0 g/m$^2$.

11. The method according to claim 9, wherein a coat weight of the gas barrier layer is 0.8 g/m$^2$ or more and less than 7.0 g/m$^2$.

12. The method according to claim 9, wherein the substrate is a fibre substrate or a paper or a paperboard.

* * * * *

UNITED STATES PATENT AND TRADEMARK OFFICE
CERTIFICATE OF CORRECTION

PATENT NO. : 10,125,286 B2
APPLICATION NO. : 14/355474
DATED : November 13, 2018
INVENTOR(S) : Larsson et al.

It is certified that error appears in the above-identified patent and that said Letters Patent is hereby corrected as shown below:

On the Title Page

Item (30) Foreign Application Priority Data:
Please correct "1100821" to read -- 1100821-6 --

Item (30) Foreign Application Priority Data:
Please correct "1250261" to read -- 1250261-3 --

In the Specification

Column 1, Line 16:
Please correct "PCT/EP2012/071495" to read -- PCT/EP2012/071494 --

Column 3, Line 34:
Please correct "aromas" to read -- aromas. --

Column 4, Line 45:
Please correct "x=3, 5, 6, 7, 8 or 11" to read -- x=3, 5, 6, 7, 8 or 11. --

Column 4, Line 60:
Please correct "x=3, 5, 6, 6.5, 7, 8, 10, 12, 15 or 20" to read -- x=3, 5, 6, 6.5, 7, 8, 10, 12, 15 or 20. --

Signed and Sealed this
Twenty-sixth Day of February, 2019

Andrei Iancu
*Director of the United States Patent and Trademark Office*